July 27, 1948.  J. E. LILIENFELD  2,445,787
METHOD OF AND APPARATUS FOR PLOTTING
AN ORDERED SET OF QUANTITIES
Filed Dec. 18, 1945  2 Sheets-Sheet 1
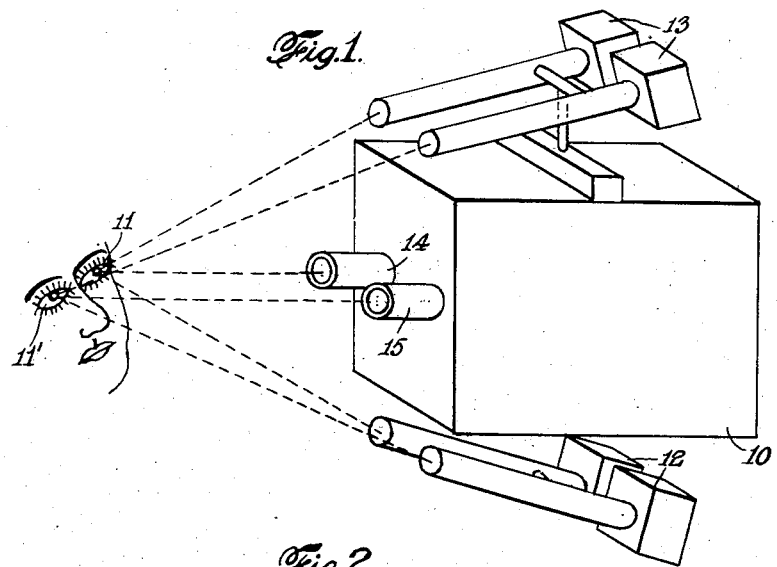
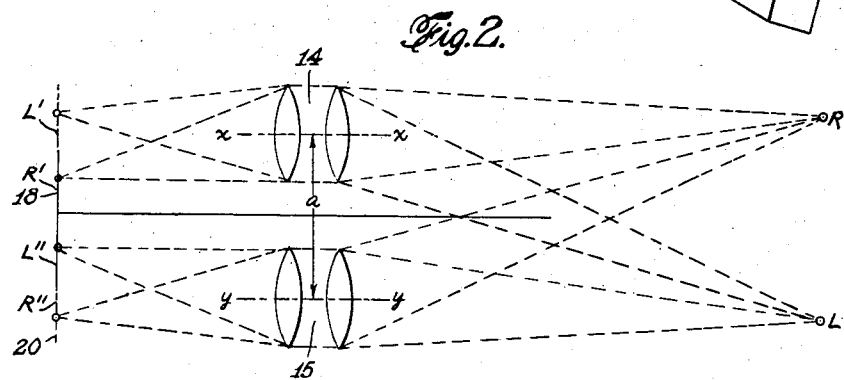
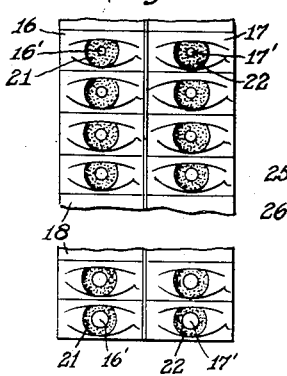 
INVENTOR.
JULIUS EDGAR LILIENFELD
BY
ATTORNEY.

July 27, 1948.  J. E. LILIENFELD  2,445,787
METHOD OF AND APPARATUS FOR PLOTTING
AN ORDERED SET OF QUANTITIES
Filed Dec. 18, 1945  2 Sheets-Sheet 2
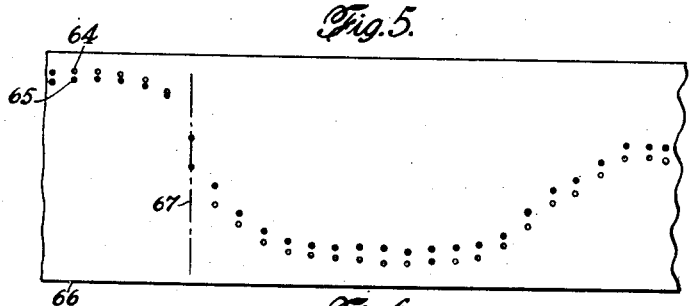
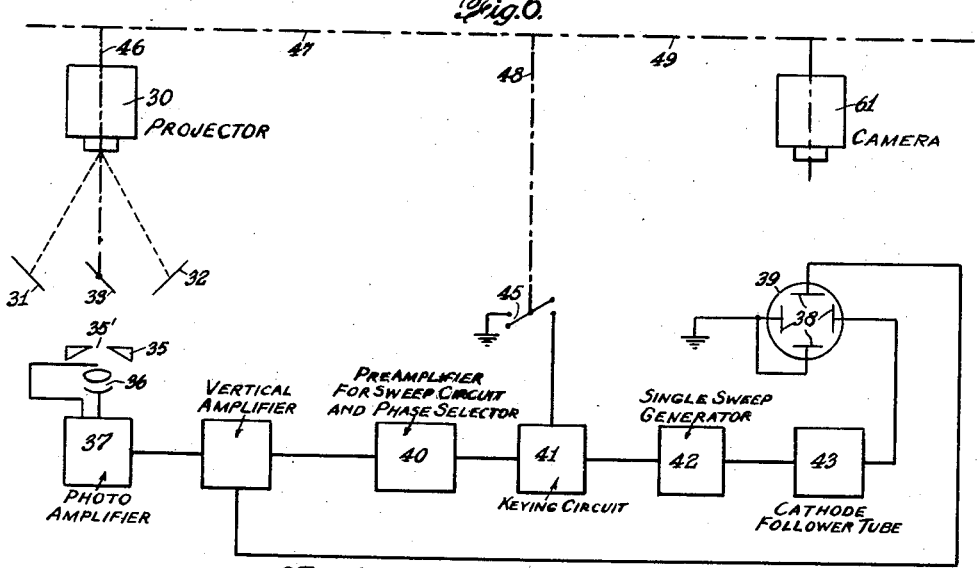
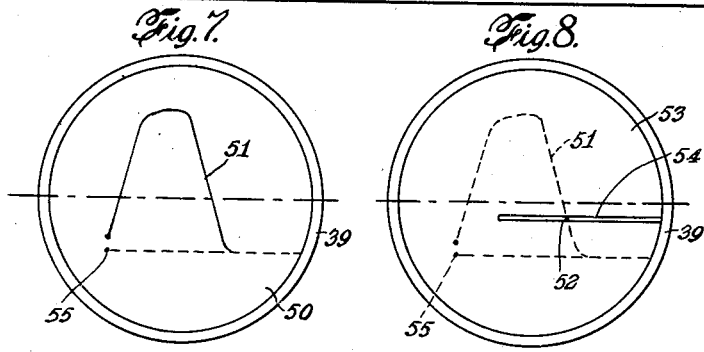
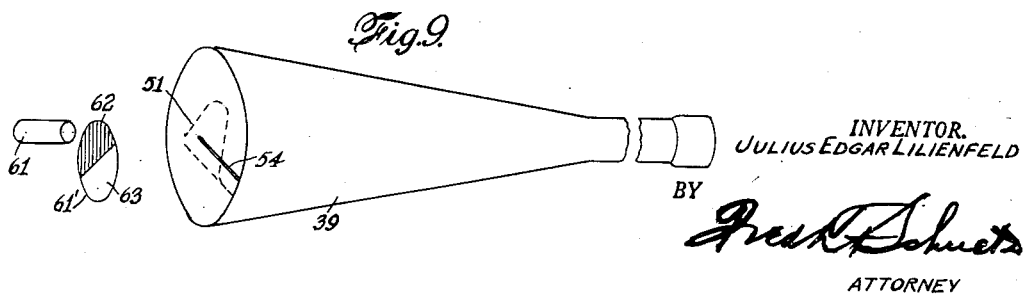
INVENTOR.
JULIUS EDGAR LILIENFELD
BY
ATTORNEY Patented July 27, 1948

2,445,787

UNITED STATES PATENT OFFICE 2,445,787

METHOD OF AND APPARATUS FOR PLOTTING AN ORDERED SET OF QUANTITIES

Julius Edgar Lilienfeld, St. Thomas, V. I.

Application December 18, 1945, Serial No. 635,797

13 Claims. (Cl. 234—61)

The invention relates to the plotting of an ordered set of quantities represented in a manner unrelated to a desired frame of reference, as in the case of a plurality of successive and varying photographic recordings provided on a band, for example, such as a sensitized film strip. A case in point is that of neuropathological diagnoses involving the task of the measurement of changes in pupil diameters resulting from the application of stimuli, and manifested in varying dilations and contractions of the subject's pupils. In such pupillographic observations, the diameters of the pupils, preferably of both eyes, are plotted against time as the subject examined is submitted to various stimuli causing passing dilations and contractions of the pupils. (See: Pupillographic Studies, Present State of Pupillography; Its Method and Diagnostic Significance. By Otto Lowenstein, M. D., and E. D. Friedman, M. D.—Reprint from the Archives of Ophthalmology, May 1942, vol. 27, pp. 969–993.)

Heretofore, it has been the practice to measure accurately from the multiplicity of photographs all of the pupil diameters and then plot them manually with reference to a desired frame. This involves a most laborious and time-consuming procedure.

The present invention has for an object to produce automatically upon a band a coordinate plot of the various quantities, in the example noted the successive pupillary diameters, which shall be related to a desired frame of reference, it being understood that the quantities are not initially so related, since it is impossible to maintain the eyes exactly in a definite position relatively to each picture frame while photographs are being made thereof, the eyes shifting both up and down as well as laterally.

A further object of the invention is to provide a method whereby, in the case of a pair of simultaneous recordings, i. e., of a pair of pupils, corresponding individual visual indications of each eye diameter are produced with respect to a desired frame of reference and photographic representations made therefrom, the representation for one pupil being characterized with respect to the similar simultaneously produced photographic representation of its companion pupil.

A still further object of the invention is to provide means whereby the areas on which the individual pupils of each pair of pupils are recorded are brought more closely together transversely of the band than would be the case normally, thus allowing of relatively greater size thereof on a band of limited width.

In carrying out the invention, there is first to be provided longitudinally of a band or tape consecutive representations of the respective quantities. This may be accomplished by means of photography, for example, in the case of pupillary diameters, by photographing upon a sensitized film or band an eye or a pair of eyes of the subject as an area of varying optical density with the boundary of the pupil area exhibiting portions of abrupt transition, the pupillary diameters varying under different stimuli applied to the subject and being consecutively photographed as set forth. However, it is understood that the invention is not confined to this particular application, for any ordered set of quantities may be thus represented along the band without reference to a desired frame for subsequent coordinate plotting with respect to a desired frame of reference.

A tape, such as a sensitized film strip having the consecutive representations photographed thereon, is caused to transmit a beam of light to project consecutive images of the respective representations, which images are optically scanned to impress light impulses upon a photoelectric cell during intervals of rest between advances of the film strip in the consecutive projection of said images. The effects of the photoelectric E. M. F. responses of such scanning are next employed to cause visual traces upon the fluorescent screen of a cathode ray tube or oscilloscope which traces, according to the invention, contain points which have finally to appear on the plot as referred to the desired frame of reference. The tube for this purpose is of the type comprising two pairs of deflector plates, the field between the plates of one pair being operated by a sweep circuit and the photoelectric impulses not only serving to deflect the cathode ray beam but, also, to "trigger" the sweep. The time axis as produced by the sweep then becomes one of the axes of the desired plot.

The respective reproductions or traces as thus limited to said points are to be photographed consecutively upon a suitable sensitized band synchronously with the projection of the initial respective representations to provide the desired plot thereof.

Such consecutive pictures being taken on a progressively and, preferably, intermittently advancing band, the motion of the latter thus affords the other axis of the desired plot.

In the case of initial representations of successive pairs of pictures, the scanning of both images belonging to each pair is effected alternately, and their final reproduction on the progressively advancing band is characterized optically to differentiate one reproduction from its companion reproduction.

The nature of the invention, however, will best be understood when described in connection with the accompanying drawings, in which:

Fig. 1 illustrates more or less diagrammatically the method of securing successive pictures representative of an ordered set of quantities.

Fig. 2 illustrates diagrammatically an optical system which may be utilized in the arrangement shown in Fig. 1 for the purpose of more effectively utilizing the limited width, for example, of a sensitized film strip.

Fig. 3 is a plan view of a length of film strip upon which have been photographed successive pictures representative of an ordered set of quantities.

Fig. 4 is a similar representation of a succession of a different set of quantities.

Fig. 5 is a plan view of a tape upon which has been photographed the plot obtained from the pictures of the film strip shown in Fig. 3 as referred to a desired frame of reference.

Fig. 6 is a diagrammatic view illustrating the various apparatus and electrical connections involved in the production of the desired plot.

Fig. 7 is an elevation of a cathode ray tube screen with trace resulting from the scanning of a picture shown on the film strip, Fig. 3; and Fig. 8 is a similar view in which a slitted mask is applied over the face of the said screen.

Fig. 9 is a fragmentary view illustrating means which may be associated with the plot producing means to differentiate the respective plots of a pair of simultaneously produced pictures by the means shown in Fig. 1.

Referring to the drawings, more particularly to Fig. 1 thereof, 10 designates a camera, substantially such as a conventional motion picture camera, for photographing consecutively, in the particular embodiment of the invention illustrated, a pair of eyes 11 and 11' which are to be subjected to various stimuli during the photography thereof. The light by which this photography is accomplished is supplied by a pair of light projectors 12 furnishing infra red or near infra red light directed tangentially to each eye. The stimuli may be afforded, for example, by a pair of light projectors 13 associated with the camera 10—the projected light, which may be varied in intensity, being designed to be directed upon the respective eyes 11 and 11'.

In this particular embodiment, the camera is shown as provided with a pair of objective lenses 14 and 15, for example, Zeiss Tessar f 3.5 and 7.5 cm. focal length lenses. These lenses may be arranged according to the optical system indicated in Fig. 2, whereby it is possible to dispose more effectively the advancing succession of pairs of pictures 16 and 17 of the respective eyes 11 and 11' upon a light-transmitting band 18 such as a sensitized film strip. By this expedient, the pictures of companion eyes are brought more closely together transversely on the band, the width of which is limited by commercial standards. This allows of more economical use of the available area by affording relatively greater size of such picture representation.

The bringing together of the pictures is effected, reference being had to Fig. 2, by disposing the objectives 14 and 15 adjacently with their respective optical axes x—x and y—y separated by the distance (a) such that, while the lens 14 will focus a picture of the two eyes, indicated at R and L, on the focal plane 20 as indicated at R'—L', and the lens 15 a picture thereof, indicated at R"—L", on said plane adjacently thereto, the outer pictures R" and L' may be discarded and caused to lie outside the width of the band 18 or film strip. The inner pictures R'—L", however, are thereby arbitrarily brought together on said band.

Such a band with successive pairs of pictures 16 and 17 of the eyes is indicated in Fig. 3 with the pupillary portions of the eyes 16' and 17' respectively being substantially transparent and with surrounding or iris portions 21 and 22 relatively dark or of varying optical density to provide abrupt optical density transitions at the boundaries of the pupils; and the pupillary diameters of the respective eyes are determined thus by the spacing between selected diametrically opposite points on such boundaries. It is these spacings which constitute the quantities to be plotted with respect to a desired frame of reference.

Of course, instead of pupillary diameters, other ordered sets of quantities may be plotted, for example, the distance along an ordinate between points of a pair of curves 25 and 26, Fig. 4, which distances do not appear developed with reference to a desired frame of reference on the original plot.

However the representations or distances may have been determined, they are to be successively transferred to a band as consecutive pictures, which in turn are to be successively projected from said band. Fig. 6 illustrates the arrangement for plotting successive pictures in pairs, as in the case of the pair of eyes hereinbefore described. In such case, while the images of each pair may be projected simultaneously, it will be understood that their final plot representation must be in consecutive order.

A convenient means for providing the desired images from the original picture representations as provided on the band 18, is a form of motion picture projector 30 for intermittently advancing the band 18, whereby in the instant embodiment a pair of adjacently disposed pictures, of the individual series 16 and 17, is projected upon fixed mirrors 31 and 32, respectively. Generally, part of the projecting beam is to be masked out so as to limit it to the immediate neighborhood of the pupil and thus to exclude all boundary lines of density transition except for those essential to the measurement. It will be understood, of course, that in the case of single pictures the fixed mirrors will be unnecessary and are to be omitted. This projection is accomplished during intervals of rest in the advance of the band; and during such period a rotating mirror 33, located between the two mirrors 31 and 32, scans the individual images with respect to a photoelectric system, indicated by the apertured member 35, by the photoelectric cell 36, and by an amplifier 37 for the photoelectric E. M. F. responses. In making the determinations in the case of eye diameters, the aperture of member 35 will be in the nature of a slit 35', while in the case of the curves 25 and 26, Fig. 4, such aperture would be of a pin-point nature. Also, the scanning motion of the image of a pupil is to be effected in a direction perpendicular to the aperture or slit 35'.

The output of the amplifier 37' is connected to one pair of deflectors 38 of a cathode ray tube 39—in the present instance, to the vertical deflectors. Amplifier 37' connects, also, to the said tube through a pre-amplifier for a sweep circuit of the tube and phase selector 40, a keying circuit 41, a single sweep generator 42 and follower tube amplifier 43. No invention is claimed for these circuits, and any suitable conventional circuits of this nature may be utilized for the purpose of sweeping the visual traces of said deflected responses over the screen of the cathode ray tube, as is well understood.

In accordance with the invention, the sweep action must be of the single sweep type and "triggered" by the impressed photoelectric impulses, in addition to their deflecting action on the cathode ray beam, at a constant point along the time base of the screen of said tube—the sweep action being synchronized with the operation of the scanning mirror 33 by the operation of resetting means in the nature of a grounding switch 45 for the keying circuit 41 and designed to restore periodically, and after each individual scanning, the cathode ray beam to its zero position.

To this end, the projector 30, scanning mirror 33 and switch 45 are interconnected mechanically by well known expedients, the connections being indicated in Fig. 6 by the broken lines 46, 47 and 48; and a further connection 49 synchronizes operation of a photographic camera associated with the cathode ray tube 39 for the purpose hereinafter set forth.

The photoelectric impulses impressed on cathode ray tube 39 effect on its screen 50, Fig. 7, a vertical component of the deflection of the cathode ray beam, while a horizontal component is added to the deflection to sweep the beam across the screen to produce a visual indication as the trace 51 thereon. It is preferred to make use only of a portion of such trace, for example, a point 52, Fig. 8; and this is conveniently effected by superposing a mask 53 over said screen or over a sensitized film upon which the points are eventually to be photographed. The mask to this end is provided with a horizontal slit 54 to intersect that more or less inclined section of the trace remote from the constant zero point 55 of the oscilloscope along the time base.

If desired, a point on the vertical portion of the trace nearer to the zero point could also be indicated by correspondingly lengthening the slit, but generally this is not desirable and might tend to confusion in the readings.

The visual indications thus provided on the screen are to be plotted upon a further band 60 as by means of a suitable camera 61 synchronized with the operation of the projector 30, scanning mirror 33 and resetting switch 45 through the connections indicated by the broken line 49, to advance the band preferably intermittently, the photography being effected progressively during intervals of rest of the projector and thus during the scanning operation which results in the production of the visual indications. The direction of the advance motion of the band 60 on which the indications are effected affords one axis of the desired plot, while the other axis is provided by the time axis of the sweep of the cathode ray tube.

Since in the instant embodiment both eyes are originally photographed, the alternate scanning of each eye of a pair will produce two consecutive visual indications, on the screen which, of course, must be photographed also consecutively on the band 60. It is desirable when photographing these alternate individual indications to differentiate between the individual indications of a pair. This may be readily effected by associating with the camera 61 a shutter 61' driven by the camera operating mechanism, the shutter having a translucent or semi-opaque half portion 62 and a transparent half portion 63 and the former portion being interposed synchronously with the production of one of the pictures of a pair of visual indications so as to dim its reproduction on the band 60 relatively to its companion reproduction thereon.

There will thus be provided on the band 60 two series of points 64 and 65, Fig. 5, along the band and generally displaced somewhat from each other transversely thereof. The indications of one series will then be representative of the quantities relating to one eye of a pair and those of the other series of the quantities relating to the other eye, both being referred to, for example, the longitudinal edge 66 of the band or to a line parallel thereto as the one axis of reference of the frame of reference, the other axis of which is at right angles thereto or a line 67 passing through two associated points of the two series. The particular quantity indicated on the band, as to whether it relates to the right eye or to the left eye, may be determined from the density of the respective reproductions; and from said reproductions, as referred to the axis 66, the physician skilled in this particular art is enabled to make deductions concerning the biological data of the subject who has submitted to the hereinbefore described procedure.

I claim:

1. Apparatus for producing automatically a co-ordinate plot of an ordered set of quantities as represented graphically upon a band in a manner not related to a desired frame of reference and each representation having successive boundary portions of abrupt optical density transition, comprising a projector for projecting consecutive images of the successive representations, the spacing between selected points of opposite boundary portions thereof being representative of said quantity; means for scanning the images successively, and a photo-electric system associated therewith whereby during intervals of rest between successive advances of the band the respective images set up a succession of photoelectric responses; a cathode ray tube with screen and a circuit for producing a uniform sweep of the beam, the said photoelectric responses being adapted to be impressed upon said tube to trigger individual single sweeps at a constant point along the time base of said screen and to provide respective traces upon said screen under the influence of the sweep circuit; and means operating synchronously with the projector to record simultaneously the respective traces produced.

2. The apparatus claimed in claim 1, wherein the scanning means comprises a rotating mirror for directing the projected images, and the said mirror is located between two fixed mirrors upon which respective images of successive pairs of images are projected.

3. The apparatus claimed in claim 1, wherein an electrical resetting switch is provided to restore periodically in accordance with the operation of the scanning means the sweeps to the constant point along the time base.

4. The apparatus claimed in claim 1, wherein an electronically controlled keying circuit is included between the photoelectric system and the cathode ray tube to trigger the single sweep of said tube.

5. The apparatus claimed in claim 1, wherein an electronically controlled keying circuit is included between the photoelectric system and the cathode ray tube to trigger the single sweep of said tube, and an electrical resetting switch is associated with the sweep circuit to restore periodically in accordance with the operation of the scanning means the sweeps to the constant point.

6. The apparatus claimed in claim 1, wherein the trace recording means comprises a photographic camera actuated synchronously with the production of the traces.

7. The apparatus claimed in claim 1, wherein a slitted masking means is interposed between the cathode ray tube and the recording means parallel to the time base of the screen to afford point indications of the traces.

8. The apparatus claimed in claim 1, wherein a slitted masking means is provided over the screen of the cathode ray tube to afford point indications of the traces.

9. The apparatus claimed in claim 1, wherein successive pictures are provided adjacently on the band in pairs, means are provided for operating the scanning means to scan separately during the same interval of rest each image of a pair, the trace recording means comprises a photographic camera actuated synchronously with the production of the traces, and means are provided to obscure partly the photograph of one trace indication of each pair.

10. The method of producing automatically a coordinate plot of an ordered set of quantities as represented graphically in a manner not related to a desired frame of reference, which comprises projecting intermittently and sequentially from a succession of equally distributed representations of said quantities images having respective opposite boundary portions of abrupt optical density transition, optically scanning the respective projected images transversely of their boundaries and setting up thereby photoelectric responses to provide corresponding oscillograms of ascending and descending branches as determined by the said boundaries of abrupt transition, and photographically recording in timed relationship to the beginning of each scanning operation a point of the oscillogram along a predetermined line.

11. The method according to claim 10, wherein the predetermined line intersects the descending branch of the oscillogram.

12. The method according to claim 10, wherein a pair of oscillograms are provided at each scanning cycle from quantity representations associated in pairs and their respective oscillogram points simultaneously photographed, and the preselected point photographic recording of one quantity is optically characterized with respect to the companion point recording.

13. The method according to claim 10, wherein the successive point photographic recordings are in a coordinate system of which the one axis is in substantially the direction of sweep of the oscillograms and the other is in the line of progression of the photographic recordings, the sweep effects and successive recordings being determinate functions of time.

JULIUS EDGAR LILIENFELD.

REFERENCES CITED

The following references are of record in the file of this patent:

UNITED STATES PATENTS

| Number | Name | Date |
| --- | --- | --- |
| 2,186,268 | Pakala | Jan. 9, 1940 |